United States Patent [19]
Yoshizuka et al.

[11] Patent Number: 5,397,188
[45] Date of Patent: Mar. 14, 1995

[54] ROLLING MEMBER

[75] Inventors: Noriyoshi Yoshizuka, Iwata;
Yoshinobu Akamatsu, Kuwana;
Kazuyoshi Harimoto, Iwata, all of Japan

[73] Assignee: NTN Corporation, Osaka, Japan

[21] Appl. No.: 111,409

[22] Filed: Aug. 25, 1993

[51] Int. Cl.⁶ .................. F16C 33/58; F16C 33/64
[52] U.S. Cl. .................... 384/492; 384/565; 384/625
[58] Field of Search ............ 384/449, 492, 548, 565, 384/569, 625

[56] References Cited

U.S. PATENT DOCUMENTS

| | | | |
|---|---|---|---|
| 4,054,339 | 10/1977 | Ladin . | |
| 4,893,387 | 1/1990 | Akamatsu et al. | 384/565 X |
| 5,064,298 | 11/1991 | Hibi et al. | 384/492 X |
| 5,147,140 | 9/1992 | Murakami et al. | 384/492 |
| 5,159,852 | 11/1992 | Harimoto | 123/90.39 X |

FOREIGN PATENT DOCUMENTS

| | | | |
|---|---|---|---|
| 24818 | 2/1986 | Japan | 384/565 |
| 282018 | 10/1992 | Japan | 384/565 |
| 2219359A | 12/1989 | United Kingdom . | |

*Primary Examiner*—Thomas R. Hannon
*Attorney, Agent, or Firm*—Nikaido, Marmelstein, Murray & Oram

[57] ABSTRACT

A rolling member which has improved strength and permits stable formation of oil films between its rolling surface and its mating surface and which shows a long life even under unfavorable lubricating conditions. The surface of the rolling member is subjected to heat treatment while nitriding. The rolling member is then treated to form minute recesses in its surface so that such surface has a surface roughness parameter RMS of not less than 0.10 μm and a negative SK value. Thus, the surface strength of the rolling element increases and the oil film forming rate improves. The surface of the rolling member is less likely to suffer peeling damage and wear. Its life is prolonged.

1 Claim, 3 Drawing Sheets

(By forming fine recesses)

(By heat treatment and forming fine recesses)

ROLLING MEMBER

This invention relates to a rolling member such as cylindrical rolling elements of a rolling contact bearing or an outer ring of a cam follower or a roller follower.

Two important factors that influence the life of a rolling member such as rollers of a rolling contact bearing are their fatigue strength and lubrication.

One known way to prolong the life of a rolling contact bearing is to make the bearing parts of a bearing steel and subject these parts to heat treatment to increase the strength of their rolling surface to HRC 58 or higher and to super-finish their rolling surface so as to provide a surface roughness of about 0.1 μm Ra.

Such a surface structure has a problem in that it is difficult to supply the rolling surface with a sufficient amount of lubricant, and therefore it is necessary to use a low-viscosity lubricant. Further, in situations where the environmental temperature is so high that the viscosity of the lubricant during operation becomes lower than 13 mm²/s and the mating surface to be brought into rolling contact with a cylindrical roller or the outer ring of a cam follower has a roughness value higher than 1.6 μm Rmax, an oil film cannot be sufficiently formed. As a result, the cylindrical roller or the outer ring of a cam follower would suffer flaking or peeling on its rolling surface in an extremely short period of time compared with its calculated life.

In order to solve these problems, it was proposed to subject the rolling member made of steel such as bearing steel, in quenching, to a heat treatment in which nitrogen is caused to penetrate into its rolling surface so that the amount of residual austenite in the surface area will increase to about 30% when formed into a complete product, thereby improving the fatigue strength. It was also proposed to form minute recesses about 1 μm deep in the rolling surface of a rolling member in an attempt to improve its oil film forming ability while its rolling member is rolling and thus to prolong its life.

But the heat treatment cannot improve the oil film forming rate though it can improve the fatigue strength of the rolling member at its surface layer. Thus, in the aforementioned operating conditions, this method cannot prolong the life of a rolling member sufficiently.

In the latter method in which the rolling surface is roughened finely, the oil film forming rate increases to a sufficient level in the above-mentioned operating conditions. But the fatigue strength of the rolling member itself remains low, so that it is difficult to prolong the bearing life sufficiently in spite of high oil film forming ability.

It is an object of this invention to provide a rolling member which is high both in the fatigue strength and the oil film forming rate and which reveals a long life even if the lubricating conditions or the surface roughness of the mating surface are not favorable.

According to this invention, there is provided a rolling member subjected to heat treatment while nitriding, and having its surface formed with minute recesses so that the surface will have an RMS value of not less than 0.10 μm and a negative SK value, and having a residual compressive stress in the surface layer of not less than 600 MPa.

By subjecting the rolling member to a treatment for increasing the residual compressive stress in its surface layer, it shows a high fatigue strength at its surface region. Further, by forming minute recesses in its surface so that the surface will have a roughness parameter RMS of not less than 0.10 μm and a negative SK value, the rate at which an oil film is formed between the rolling surfaces improves. These advantages serve in cooperation to reduce the occurrence of flaking and peeling and thus to prolong the life of the rolling member even if the lubricating conditions are not good or the mating surface is rough.

Other features and objects of the present invention will become apparent from the following description made with reference to the accompanying drawings, in which.

Figure 5:
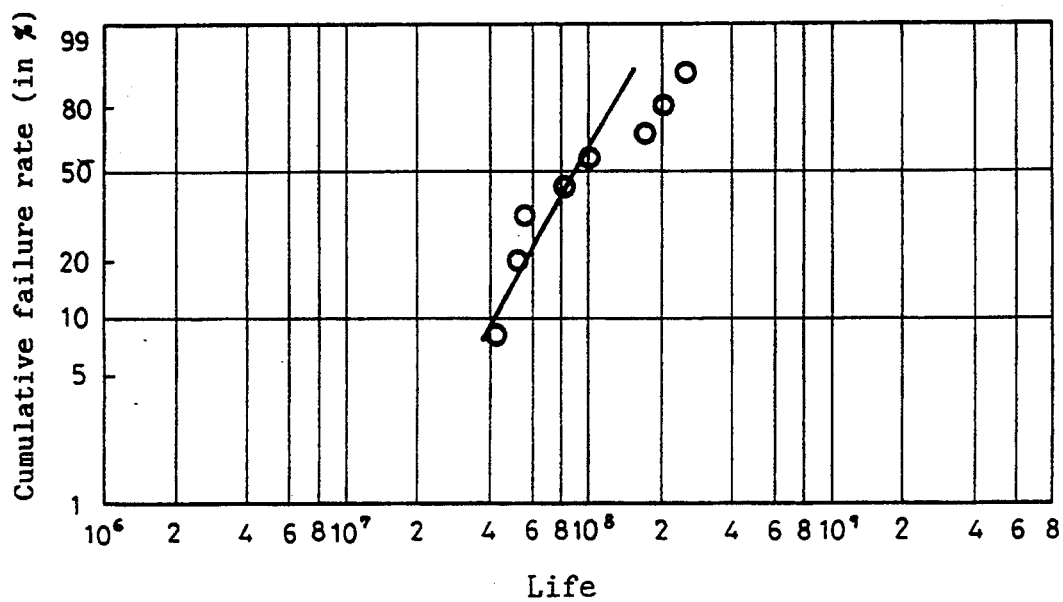
Figure 6:
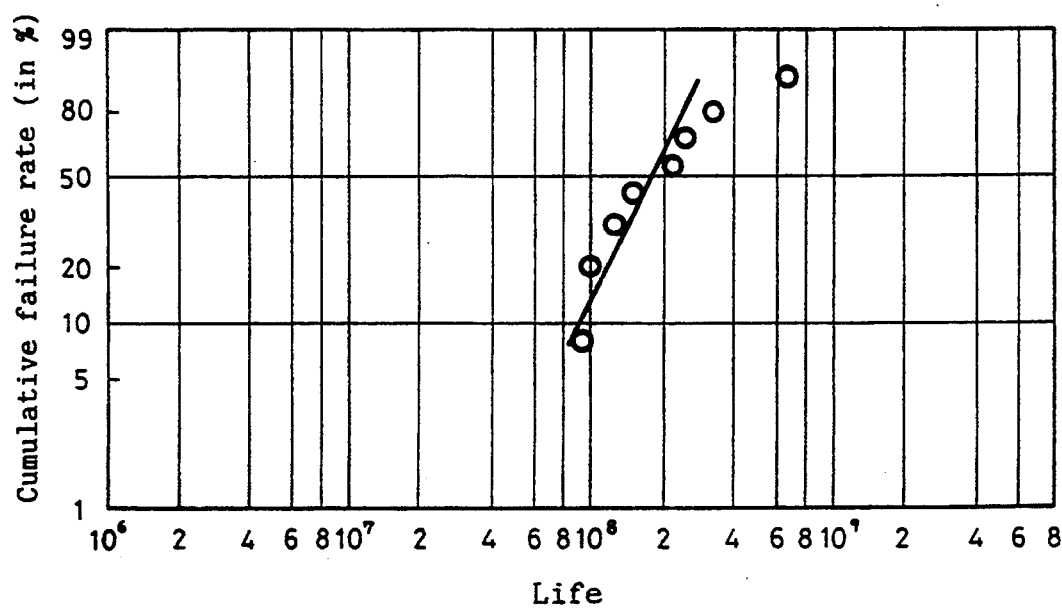

FIG. 5 is graph showing a Weibull distribution which represents the cumulative failure rate and the life of needle rollers having their surfaces formed with minute recesses; and FIG. 6 is graph showing a Weibull distribution which represents the cumulative failure rate and the life of needle rollers according to this invention having their surfaces subjected to a heat treatment and formed with minute recesses.

Figure 1:
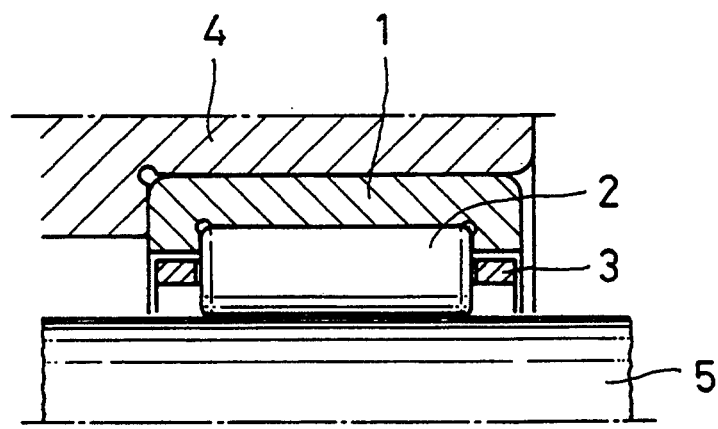
FIG. 1 is a sectional view of a rolling contact bearing having rolling elements as rolling members.

FIG. 1 shows a rolling contact bearing having rolling elements as rolling members by way of example. It comprises an outer ring 1, a plurality of cylindrical rollers 2 mounted along the inner circumferential surface of the outer ring 1, and a cage 3 for keeping the rollers 2 apart from each other at equal intervals. The outer ring 1 is mounted in a housing 4. A shaft 5 is inserted in the rolling contact bearing and supported by the cylindrical rollers 2.

Figure 2A:
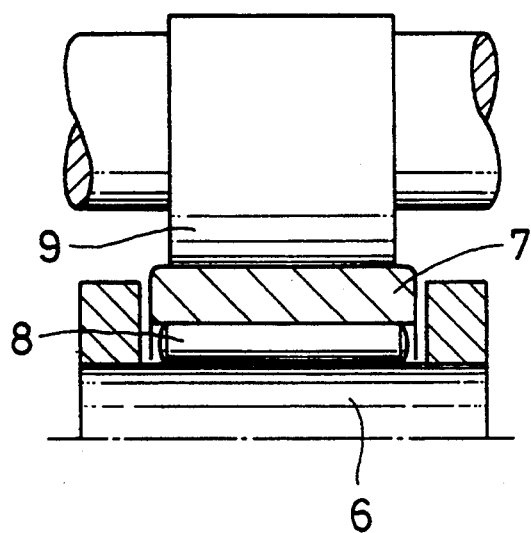
FIG. 2A is a vertical sectional front view of a cam follower having an outer ring as a rolling member.
Figure 2B:
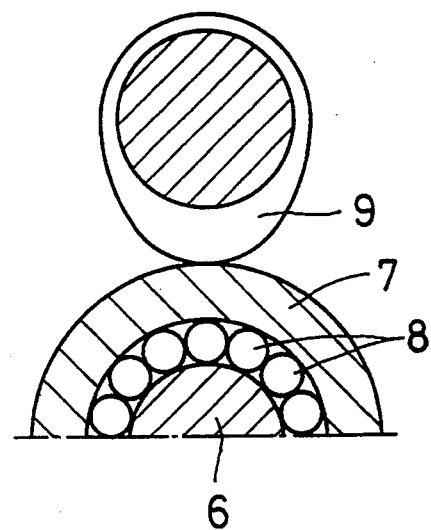
FIG. 2B is a vertical sectional side view of the same.
Figure 3:
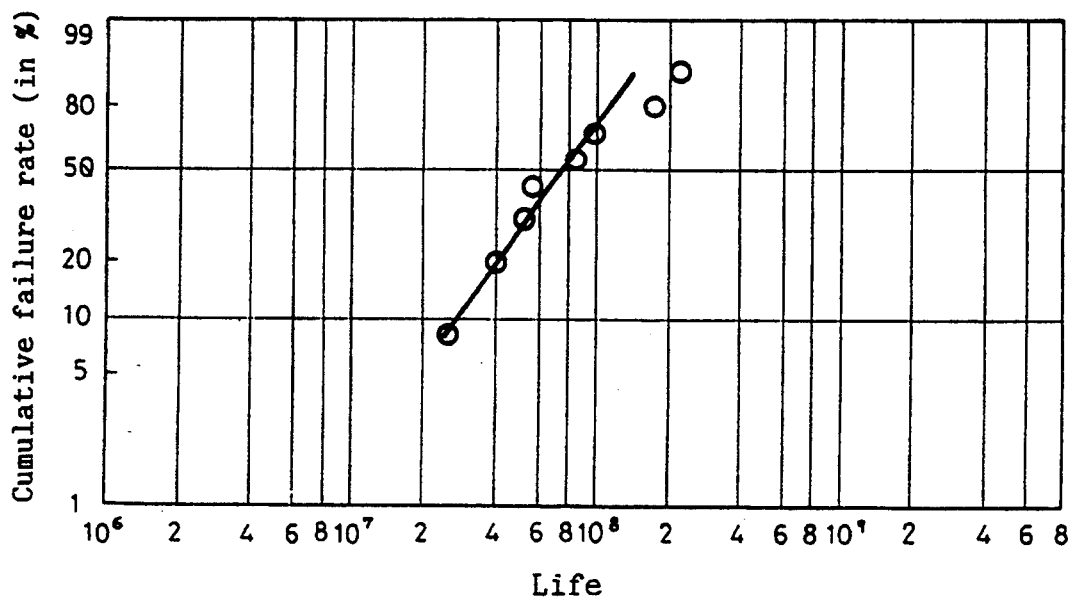
FIG. 3 is graph showing a Weibull distribution which represents the cumulative failure rate and the life of needle rollers having their surfaces subjected to a heat treatment.
Figure 4:
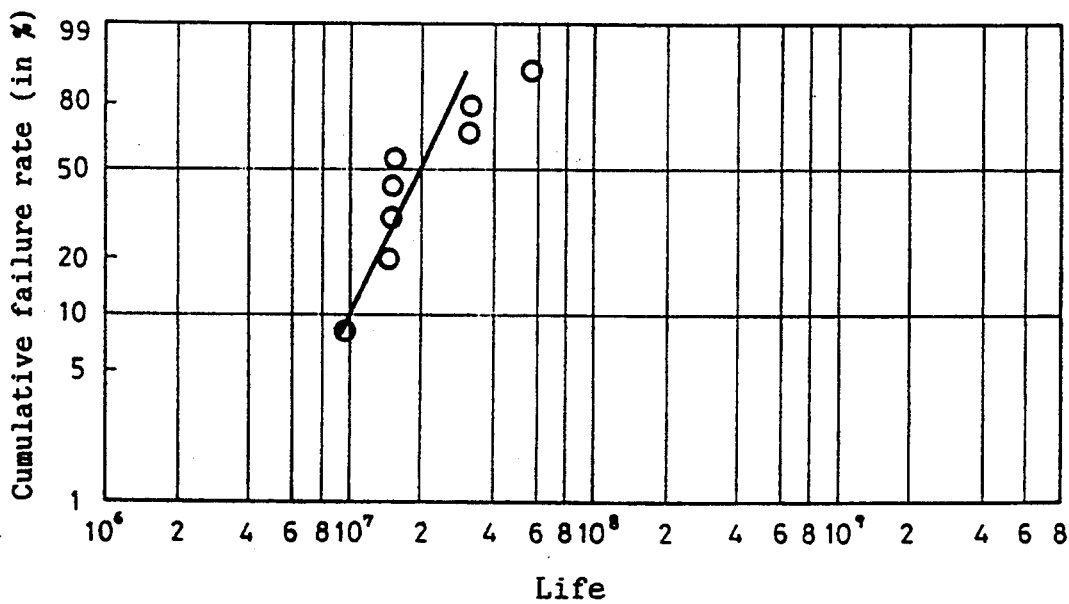
FIG. 4 is graph showing a Weibull distribution which represents the cumulative failure rate and the life of needle rollers having their surfaces super-finished.

FIGS. 2A and 2B show an example of a cam follower. It comprises a shaft 6, an outer ring 7 mounted around the shaft 6 and a plurality of needle rollers 8 disposed therebetween. A cam 9 is brought into contact with the outer periphery of the outer ring 7.

The rolling members of the rolling contact bearing are the cylindrical rollers 2 and those of the cam follower are the outer ring 7 and the needle rollers 8. These rolling members are made of a high carbon steel such as bearing steel and are subjected to a heat treatment to increase the residual compressive stress at the surface layer.

In the heat treatment, the work is hardened at a temperature of 820° to 860° C. for four hours. During the hardening, the work is nitrized to cause nitrogen to penetrate into the surface of a work to increase the contents of carbon and nitrogen in the surface layer of the work. The work is then tempered at a temperature of 150° to 200° C. to increase the content of residual austenite in the surface layer by about 30% and thus to increase the residual compressive stress at the surface layer, thereby increasing the fatigue strength and the rolling fatigue life.

The surfaces of the rolling members are toughened after heat treatment so that minute or fine recesses are formed in the surfaces in random directions.

The rolling member after roughened should have a residual compressive stress in the surface layer of not less than 600 MPa.

Such a surface roughness should have an RMS value of not less than 0.10 μm and a negative SK value, preferably ≦ −1.6 both in axial and circumferential directions.

The roughness of surface formed with minute recesses should be such that when expressed in the terms of parameter RMS, RMS will be not less than 0.10 μm and that the SK value, which is another parameter of surface roughness, be minus, preferably equal to or less than −1.6.

In order to achieve such a surface roughness on a rolling surface, barrel grinding may be used to obtain a desired finished surface.

The above-mentioned SK value represents skewness of the surface roughness distribution curve. If the distribution curve is symmetrical as in the Gaussian distribution, the SK value will be zero. In the present invention, if the surface roughness has an SK value of > −1.6 both in the axial and circumferential directions, the recesses in the surface will be shaped and distributed in such an advantageous way that an oil film can be formed.

We prepared needle rollers having their surfaces treated in different ways. They were subjected to a life test using a rolling contact fatigue life tester. We will now discuss the results of the test.

Eight needle rollers were prepared for each type, each roller having a diameter D of 5 mm and a length L of 13 mm. The outer ring in which the needle rollers are mounted had an outer diameter Dr of 38 mm and an inner diameter dr of 28 mm.

Four different types of rollers were prepared by subjecting the rollers to different kinds of surface treatment, i.e. 1) super-finishing, 2) heat treatment, 3) forming minute recesses and 4) according to the present invention, heat treatment and then forming minute recesses.

FIGS. 3–6 show the life and the cumulative failure rate of each type of the needle rollers tested. Table 1 shows the test results.

As will be apparent from the life test results, the lives of the needle rollers subjected to the surface treatment according to the present invention were several times longer than those of the rollers subjected to other surface treatments.

Such long lives are considered to be attributable to the improved fatigue strength due to increased residual compressive stress at the surface area and to the improved oil film forming rate due to the formation of minute recesses.

[TABLE 1]

| Surface treatment | Number of rollers tested | $L_{10}$ *1 | $L_{50}$ *2 | e *3 | $L_{10}$ ratio *4 |
|---|---|---|---|---|---|
| Super-finishing | 8 | $1.01 \times 10^7$ | $1.95 \times 10^7$ | 2.89 | 1 |
| Heat treatment | 8 | $2.72 \times 10^7$ | $7.28 \times 10^7$ | 1.91 | 2.6 |
| Forming minute recesses | 8 | $4.26 \times 10^7$ | $9.03 \times 10^7$ | 2.51 | 4.2 |
| Heat treatment + Forming minute recesses | 8 | $9.28 \times 10^7$ | $1.78 \times 10^8$ | 2.90 | 9.2 |

*1 10% life (10% failed when load applied x times)
*2 50% life (50% failed when load applied x times)
*3 Weibull slope
*4 Ratio betweeen 10% life values

What is claimed is:

1. A rolling member at least a surface of which has been subjected to heat treatment under a nitriding atmosphere; wherein said surface has formed therein a multiplicity of minute recesses so that said surface has an RMS value of not less than 0.10 μm, a negative SK value, and a residual compressive stress of not less than 600 MPa.

* * * * *